(12) United States Patent
Hwang et al.

(10) Patent No.: US 12,525,234 B2
(45) Date of Patent: Jan. 13, 2026

(54) LOW POWER ALWAYS-ON LISTENING ARTIFICIAL INTELLIGENCE (AI) SYSTEM

(71) Applicant: QUALCOMM Incorporated, San Diego, CA (US)

(72) Inventors: Kyu Woong Hwang, Daejeon (KR); Simyung Chang, Suwon (KR); Sungha Choi, Goyang-si (KR); Joo Seong Jeong, Seoul (KR); Hyoungwoo Park, Seoul (KR); Kyuhong Shim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 18/468,964

(22) Filed: Sep. 18, 2023

(65) Prior Publication Data

US 2025/0095643 A1    Mar. 20, 2025

(51) Int. Cl.
   *G10L 15/197*   (2013.01)
   *G10L 15/06*    (2013.01)
   *G10L 15/22*    (2006.01)

(52) U.S. Cl.
   CPC .......... *G10L 15/197* (2013.01); *G10L 15/063* (2013.01); *G10L 15/22* (2013.01); *G10L 2015/0635* (2013.01)

(58) Field of Classification Search
   CPC ..... G10L 15/197; G10L 15/063; G10L 15/22; G10L 2015/0635
   USPC ........................................................ 704/244
   See application file for complete search history.

(56) References Cited

U.S. PATENT DOCUMENTS

| | | | | |
|---|---|---|---|---|
| 5,799,279 A | * | 8/1998 | Gould | G10L 15/1815 704/E15.044 |
| 5,893,065 A | * | 4/1999 | Fukuchi | G10L 19/0204 704/229 |
| 5,960,399 A | * | 9/1999 | Barclay | H04L 65/762 704/270.1 |
| 6,002,762 A | * | 12/1999 | Ramsden | H04M 3/18 379/406.06 |
| 6,397,186 B1 | * | 5/2002 | Bush | G06F 3/167 704/E15.044 |

(Continued)

FOREIGN PATENT DOCUMENTS

| | | |
|---|---|---|
| CN | 112331189 A | 2/2021 |
| JP | 2020038709 A | 3/2020 |
| WO | 2023038654 A1 | 3/2023 |

OTHER PUBLICATIONS

International Search Report and Written Opinion—PCT/US2024/039129—ISA/EPO—Sep. 25, 2024.

*Primary Examiner* — Thuykhanh Le
(74) *Attorney, Agent, or Firm* — Polsinelli LLP

(57) ABSTRACT

Various embodiments include systems and methods for continuous speech monitoring artificial intelligence solutions. A low-power always-on listening module (LPALM) may maintain continuous auditory awareness or alertness without consuming an excessive amount of the processing, memory, or battery resources of the user computing system or device. As such, the LPALM may operate on the computing device for an extended period of time without depleting the device's battery resources, rendering the user device non-responsive, or otherwise having a negative or user-perceivable impact on the performance, functionality, or power consumption characteristics of the user device.

12 Claims, 8 Drawing Sheets

(56) References Cited

U.S. PATENT DOCUMENTS

| | | | | |
|---|---|---|---|---|
| 6,629,070 B1* | 9/2003 | Nagasaki | G10L 25/78 | 704/E11.003 |
| 6,993,119 B1* | 1/2006 | Zhang | H04M 3/54 | 704/231 |
| 8,031,881 B2* | 10/2011 | Zhang | H04R 25/407 | 704/250 |
| 8,265,610 B1* | 9/2012 | Delker | G06Q 30/0201 | 455/414.4 |
| 8,428,272 B2* | 4/2013 | Tohyama | G10K 11/1752 | 704/226 |
| 8,909,522 B2* | 12/2014 | Shperling | G10L 25/78 | 381/71.1 |
| 9,159,319 B1* | 10/2015 | Hoffmeister | G10L 15/08 | |
| 10,192,546 B1* | 1/2019 | Piersol | G10L 15/08 | |
| 11,400,367 B1* | 8/2022 | Ichapurapu | A63F 13/355 | |
| 12,190,902 B1* | 1/2025 | Joshi | G10L 15/05 | |
| 2002/0046023 A1* | 4/2002 | Fujii | G10L 15/30 | 704/E15.047 |
| 2002/0072905 A1* | 6/2002 | White | G10L 15/30 | 704/E15.047 |
| 2002/0107726 A1* | 8/2002 | Torrance | G09B 7/02 | 705/12 |
| 2003/0033143 A1* | 2/2003 | Aronowitz | G10L 17/12 | 704/E17.01 |
| 2003/0040903 A1* | 2/2003 | Gerson | H04M 3/493 | 704/211 |
| 2003/0105637 A1* | 6/2003 | Rodriguez | G06F 40/242 | 704/E15.047 |
| 2003/0212562 A1* | 11/2003 | Patel | G10L 15/30 | 704/E15.047 |
| 2003/0236664 A1* | 12/2003 | Sharma | G10L 15/08 | 704/251 |
| 2005/0043948 A1* | 2/2005 | Kashihara | G10L 15/142 | 704/242 |
| 2005/0209858 A1* | 9/2005 | Zak | H04W 4/10 | 704/275 |
| 2005/0216271 A1* | 9/2005 | Konig | G10L 15/22 | 704/E15.04 |
| 2005/0246165 A1* | 11/2005 | Pettinelli | G10L 15/1807 | 704/E15.025 |
| 2006/0029190 A1* | 2/2006 | Schultz | H04M 3/385 | 379/88.01 |
| 2006/0058947 A1* | 3/2006 | Schalk | G08G 1/096872 | 701/427 |
| 2006/0074661 A1* | 4/2006 | Takaichi | G10L 15/22 | 704/E15.04 |
| 2006/0080099 A1* | 4/2006 | Thomas | G10L 25/87 | 704/E11.005 |
| 2007/0005368 A1* | 1/2007 | Chutorash | G10L 15/30 | 704/275 |
| 2007/0043868 A1* | 2/2007 | Kumar | G10L 15/26 | 703/12 |
| 2007/0198245 A1* | 8/2007 | Kamatani | G06F 40/58 | 704/E15.045 |
| 2007/0266101 A1* | 11/2007 | Patel | G06Q 10/107 | 709/206 |
| 2008/0046250 A1* | 2/2008 | Agapi | G10L 15/075 | 704/275 |
| 2008/0172230 A1* | 7/2008 | Hayakawa | G10L 17/14 | 704/E17.001 |
| 2008/0172232 A1* | 7/2008 | Gurley | G08B 13/1672 | 704/251 |
| 2008/0235726 A1* | 9/2008 | Sakao | H04N 21/44008 | 725/38 |
| 2009/0005127 A1* | 1/2009 | Frenger | H04W 68/02 | 455/574 |
| 2009/0018832 A1* | 1/2009 | Mukaigaito | H04M 1/2535 | 704/E15.024 |
| 2009/0170501 A1* | 7/2009 | Olson | H04W 36/0088 | 455/425 |
| 2009/0265169 A1* | 10/2009 | Dyba | G10L 19/012 | 704/E15.001 |
| 2010/0057450 A1* | 3/2010 | Koll | G10L 15/32 | 704/270.1 |
| 2010/0062745 A1* | 3/2010 | Silk | H04L 51/18 | 455/414.1 |
| 2010/0076751 A1* | 3/2010 | Chikuri | G10L 15/22 | 704/E15.005 |
| 2010/0110834 A1* | 5/2010 | Kim | G01S 3/8083 | 367/124 |
| 2010/0277579 A1* | 11/2010 | Cho | G06V 40/20 | 704/238 |
| 2010/0306285 A1* | 12/2010 | Shah | G06F 40/211 | 707/E17.005 |
| 2011/0113349 A1* | 5/2011 | Kiciman | G06F 16/972 | 715/753 |
| 2011/0165912 A1* | 7/2011 | Wang | G10L 13/033 | 704/E13.011 |
| 2011/0276326 A1* | 11/2011 | Fumarolo | G10L 15/26 | 704/235 |
| 2011/0288860 A1* | 11/2011 | Schevciw | G10L 25/78 | 704/E15.039 |
| 2012/0022863 A1* | 1/2012 | Cho | G10L 25/84 | 704/E15.039 |
| 2012/0054054 A1* | 3/2012 | Kameyama | G01C 21/3679 | 705/26.1 |
| 2012/0078624 A1* | 3/2012 | Yook | G10L 25/78 | 704/E17.001 |
| 2012/0145487 A1* | 6/2012 | Yoo | B66B 1/3453 | 187/380 |
| 2012/0215537 A1* | 8/2012 | Igarashi | H04N 21/42204 | 704/E15.004 |
| 2012/0220271 A1* | 8/2012 | Goldfarb | H04M 3/2281 | 455/414.1 |
| 2013/0054248 A1* | 2/2013 | Ohno | G06F 3/017 | 704/E21.001 |
| 2013/0066633 A1* | 3/2013 | Krishnan | G06F 16/955 | 704/270.1 |
| 2013/0080171 A1* | 3/2013 | Mozer | G10L 15/22 | 704/E15.001 |
| 2013/0080877 A1* | 3/2013 | Kim | G06F 16/957 | 715/234 |
| 2013/0085753 A1* | 4/2013 | Bringert | G10L 15/32 | 704/E15.039 |
| 2013/0085755 A1* | 4/2013 | Bringert | G10L 21/10 | 704/235 |
| 2013/0132086 A1* | 5/2013 | Xu | G10L 15/065 | 704/251 |
| 2013/0173268 A1* | 7/2013 | Weng | G10L 17/24 | 704/E15.001 |
| 2013/0289994 A1* | 10/2013 | Newman | G10L 15/22 | 704/E15.005 |
| 2013/0339028 A1* | 12/2013 | Rosner | G10L 15/22 | 704/E11.001 |
| 2014/0006825 A1* | 1/2014 | Shenhav | G06F 1/3206 | 713/323 |
| 2014/0012573 A1* | 1/2014 | Hung | G10L 15/28 | 704/E15.039 |
| 2014/0122059 A1* | 5/2014 | Patel | G06F 16/40 | 704/235 |
| 2014/0122087 A1* | 5/2014 | Macho | G10L 15/22 | 704/275 |
| 2014/0163978 A1* | 6/2014 | Basye | G10L 15/28 | 704/233 |
| 2014/0178049 A1* | 6/2014 | Kihara | H04N 5/262 | 386/280 |
| 2014/0337016 A1* | 11/2014 | Herbig | G10L 25/27 | 704/201 |
| 2014/0337031 A1* | 11/2014 | Kim | G10L 15/08 | 704/251 |
| 2015/0081725 A1* | 3/2015 | Ogawa | H04L 12/1859 | 707/754 |
| 2015/0162002 A1* | 6/2015 | Liu | G06F 1/3206 | 704/235 |
| 2015/0199961 A1* | 7/2015 | Arkko | G06F 3/167 | 704/251 |
| 2015/0279352 A1* | 10/2015 | Willett | G10L 15/30 | 704/231 |

(56) References Cited

U.S. PATENT DOCUMENTS

| | | | | |
|---|---|---|---|---|
| 2017/0329573 | A1* | 11/2017 | Mixter | H04N 21/4104 |
| 2018/0090131 | A1* | 3/2018 | Mangalath | G10L 15/142 |
| 2019/0027145 | A1* | 1/2019 | Kerr | G10L 15/22 |
| 2020/0020328 | A1* | 1/2020 | Gordon | G10L 15/08 |
| 2020/0118548 | A1* | 4/2020 | Huang | G10L 15/30 |
| 2021/0027798 | A1* | 1/2021 | Sundaram | G10L 15/22 |
| 2021/0110824 | A1* | 4/2021 | Lim | G10L 15/18 |
| 2021/0233515 | A1* | 7/2021 | Piersol | G10L 17/22 |
| 2021/0319789 | A1 | 10/2021 | Yoon et al. | |
| 2022/0051679 | A1* | 2/2022 | Kuroda | G10L 17/02 |
| 2022/0189469 | A1* | 6/2022 | Carbune | G10L 15/285 |
| 2022/0293100 | A1* | 9/2022 | Deng | G06F 3/167 |
| 2022/0366906 | A1* | 11/2022 | Wu | G10L 15/30 |
| 2024/0265957 | A1* | 8/2024 | Kim | G11C 8/18 |
| 2024/0420695 | A1* | 12/2024 | Luncan | G06F 3/167 |

\* cited by examiner

LOW POWER ALWAYS-ON LISTENING ARTIFICIAL INTELLIGENCE (AI) SYSTEM

BACKGROUND

Generally, voice-activated computing systems interact with users through vocal commands or queries. These systems rely on a combination of microphone hardware and natural language processing software to capture and interpret human speech. Upon receiving specific voice prompts or keywords, the voice-activated system may transition from a passive listening state to an active state in which it may execute tasks, provide information, or perform various functions. Generally, such systems facilitate user interaction with devices or software applications by replacing or supplementing manual input methods such as typing or clicking. Voice-activated computing systems capabilities may range from simple task execution to more complex conversational interactions.

Conventional voice-activated systems may operate based on predefined voice prompts or keywords to initiate interactions with users. Unlike continuous speech monitoring systems, these systems remain in a passive listening state until activated by a particular vocal cue, such as "Hey SIRI" or "Ok GOOGLE." In response to detecting the prompt, the system may shift from its low-power, idle state to a more engaged mode in which it may receive and process additional commands or queries. Generally, such systems are not context aware and simply focus on executing specific tasks or answering questions based on immediate instructions or direct queries.

SUMMARY

Various aspects include methods and processing systems for continuously or repeatedly monitoring speech for preemptive or context-aware answers to user queries. In some aspects, the methods may include collecting, in a low-power always-on listening mode operating on a processing system in a computing device, ambient audio data and storing the collected ambient audio data and activation timestamps in an audio buffer as buffered audio data, determining a confidence score based on a result of analyzing the buffered audio data for linguistic cues or non-linguistic cues, and activating a high-power listening mode and providing a last portion of the audio buffer to the high-power mode for instant context-aware assistance in response to determining that the confidence score exceeds a threshold value.

In some aspects, determining the confidence score based on a result of analyzing the buffered audio data for linguistic cues or non-linguistic cues may include determining the confidence score based on a result of analyzing the buffered audio data for linguistic cues that include syntax cues, semantic cues, subword cues, context cues, and co-occurrence cues. In some aspects, determining the confidence score based on a result of analyzing the buffered audio data for linguistic cues or non-linguistic cues may include determining the confidence score based on a result of analyzing the buffered audio data for non-linguistic cues that include prosody cues, pitch cues, speech rate cues, volume cues, temporal pattern cues, and acoustic feature cues.

Some aspects may further include using a trained language model to identify linguistic cues or non-linguistic cues. Some aspects may further include transitioning to a periodic training mode in response to determining that the computing device may be connected to a stable power source. Some aspects may further include retrieving the buffered audio data and activation timestamps from the audio buffer, using a result of applying the retrieved audio data to a large language model (LLM) to identify instances in which activation high-power listening mode should have occurred but did not, labeling the identified instances and their corresponding timestamps, generating updated machine learning models for the low-power always-on listening mode based on the labels, and replacing a current machine learning model of the low-power listening mode with the generated updated machine learning models.

Further aspects may include a computing device having a processing system configured with processor-executable instructions to perform various operations corresponding to the methods summarized above. Further aspects may include a non-transitory processor-readable storage medium having stored thereon processor-executable instructions configured to cause a processing system to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
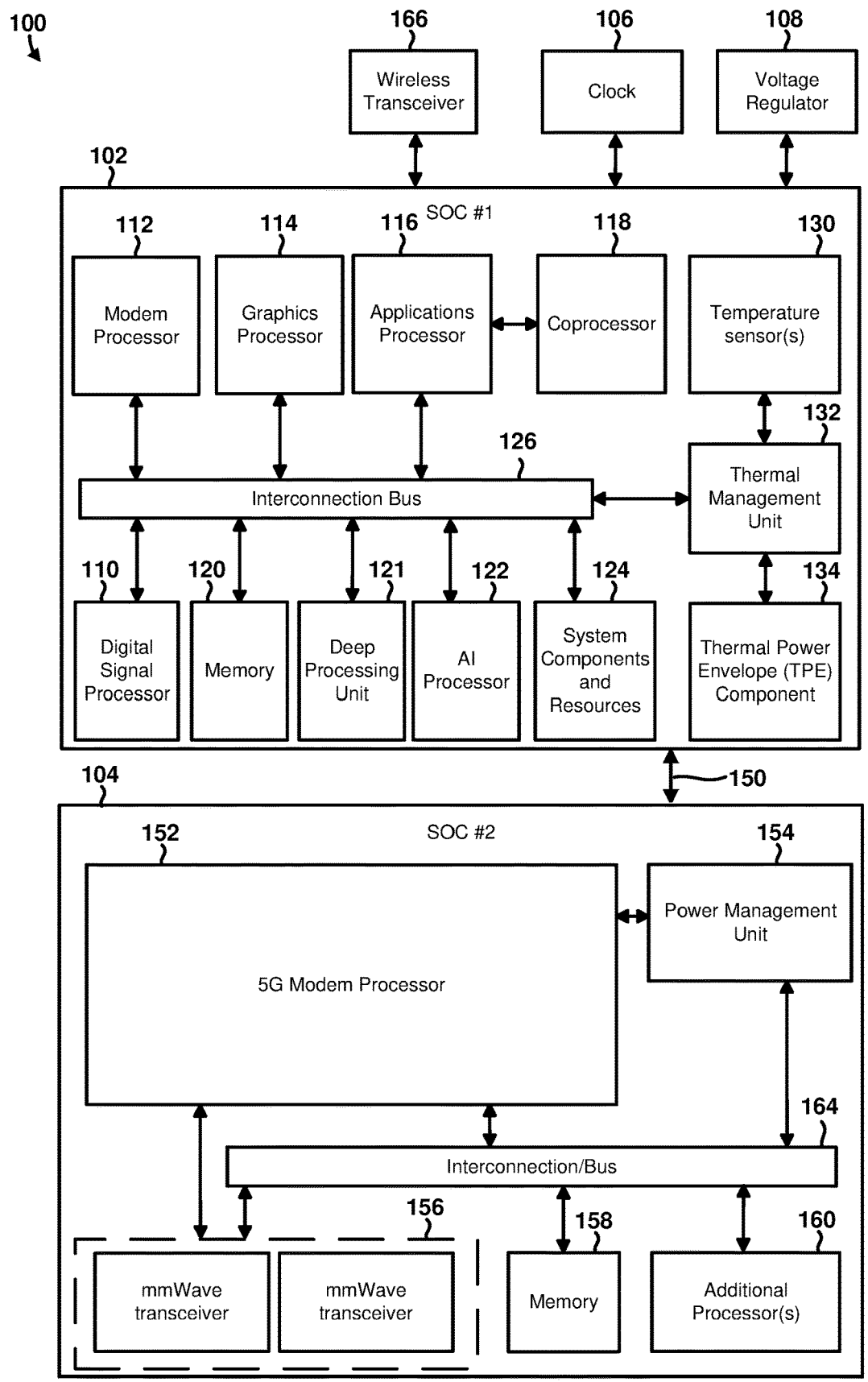
FIG. 1 is a component block diagram illustrating example components in system in package (SIP) that may be included in a computing device and configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and devices, such as smartphones, tablet computers and personal computers, that provide a low-power always-on listening mode for an artificial intelligence (AI) type assistant function that recognizes when it is appropriate to activate the AI assistant without requiring the user to speak a particular trigger word or phrase. Various embodiments may enable the low-power always-on listening mode functionality to be trained using machine learning over time to recognize when a user is saying something or speaking in a manner that suggests the user could benefit from the AI assistant. Upon recognizing such situations, the low-power always-on listening mode functionality may activate a high-power AI assistant mode that then listens and responds to the user. In some embodiments, the low-power always-on listening mode use machine may learn to activate the high-power AI assistant mode based on the context of spoken words, plus tonality, cadence, and other features of the user's voice.

In some embodiments, the always-on listening mode functionality may include a memory buffer that is always recording sounds (at least in response to sounds of user). This buffer may be accessible by the high-power AI assistant and/or a portion of (or a buffer pointer to) already spoken words of the user stored in the buffer may be provided as part of activating the high power AI assistant mode. In this matter, the AI assistant receives data regarding the words and context leading up to activation, thereby enabling the AI assistant to immediately provide assistance to the user without requiring the user to repeat questions or statements that prompted activation.

In some embodiments, the low-power always-on listening mode functionality may perform periodic training, such as when the computing device is connected to power. During such training, the high-power AI assistant may process audio data in the always listening buffer to identify when the AI assistant should have been activated (i.e., the user could have used assistance had to speak a key word to trigger activation) but was not, and identify when the AI assistant was activated unnecessarily (i.e., the user did not need or want assistance). As the AI assistant may be a trained large language model (LLM) AI system, these instances may be recognized based on user speech recorded in the buffer and dialogs the AI assistant had with the user after activation. For each instance of missed or unnecessary activations, the AI assistant may provide the determined conclusions with timestamps to corresponding sounds in the buffer in a manner that enables machine learning of context by the low-power always-on listening function.

The term "computing device" may be used herein to refer to any one or all of personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., earbuds, smartwatch, head-mounted display, fitness tracker, etc.), media players (e.g., DVD players, ROKU™, AppleTV™, etc.), digital video recorders (DVRs), automotive displays, portable projectors, 3D holographic displays, and other similar devices that include a display and a programmable processing system that can be configured to provide the functionality of various embodiments.

The term "processing system" is used herein to refer to one more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

Voice-activated AI systems (e.g., Siri, Google Assistant, etc.) convert spoken language into text through a process known as speech recognition. After interpreting the text, these systems match the query to a set of pre-defined algorithms or procedures to provide an appropriate response or perform a specified task. These systems may also use machine learning models to interpret natural language and offer more accurate and/or more relevant answers to user queries. Many of these systems also include the ability to interact with other software and hardware components so as to allow users to control various aspects of their digital environment by spoken command (e.g., turn on lights, television, etc.). While these systems have become increasingly proficient at understanding and responding to a broad range of queries, they include a number of technical challenges and limitations (e.g., interpreting context, comprehending accents, dialects, or complex requests, etc.).

Some embodiments may include computing devices that are equipped with a continuous speech-monitoring AI system that continuously or perpetually listens to and analyzes human speech and/or other sensor data to preemptively identify user queries. Unlike conventional voice-activated systems that await specific prompts to initiate an interaction, the continuous speech-monitoring AI system may maintain an ongoing auditory observation of the users (e.g., they are always listening and analyzing) to better understand the user's context, emotional tone, and immediate needs. The continuous speech-monitoring AI system may also implement and/or use advanced natural language processing (NLP) algorithms to interpret spoken words, phrases, or sentences for more accurate and/or context-aware answers, assistance, actions, or controls.

Continuous speech-monitoring AI systems face various technical challenges due to the high energy consumption associated with using advanced LLM AI capabilities for continuous monitoring. For example, LLM AI systems may require significant processing and/or energy resources in order to continuously listen to users and analyze their speech for contextual clues and/or to proactively initiate actions or generate responses, which may quickly deplete the often limited battery resources of user devices, render the user device non-responsive, and/or otherwise degrade the user experience. A continuous speech monitoring AI system may be configured to overcome these and other technical challenges.

In various embodiments, a continuous speech monitoring AI system may include a low-power always-on listening module (LPALM) that is configured to maintain continuous auditory awareness or alertness without consuming an excessive amount of the processing, memory, or battery resources of the user computing system or device. As such, the LPALM may operate on the computing device for an extended period of time without depleting the device's battery resources, rendering the user device non-responsive, or otherwise having a negative or user-perceivable impact on the performance, functionality, or power consumption characteristics of the user device.

In some embodiments, the computing system may be configured to implement a dual-layer continuous speech monitoring system that provides context-sensitive always-on listening AI capabilities while balancing various tradeoffs between performance, functionality, and power consumption. The dual-layer continuous speech monitoring system may be configured to predominantly operate in a low-power mode and transition to a higher-power mode that provides more robust functionality only when contextual cues indicate that the user may benefit from immediate or more robust AI assistance.

In some embodiments, the dual-layer continuous speech monitoring system may include the LPALM, a waker module, a high-power responsive module (HPRM), and/or a periodic training module (PTM). The LPALM may operate in a low-power state or mode (e.g., a low-power always-on listening mode, etc.) to perform fundamental listening operations such as speaker identification, recording detected speech or speech features in a log, and/or scanning for vocal or environmental triggers that warrant the activation of more comprehensive listening and processing. For example, in some embodiments, the LPALM may be configured to capture ambient sound, analyze the captured sound for potential voice or environmental triggers, generate metadata based on the analysis results, store the metadata in a log and/or send the metadata to a waker module.

The waker module may be configured to monitor the information collected by the LPALM triggers and activate or invoke the HPRM for more in-depth interaction and analysis in response to detecting vocal or environmental triggers that warrant the activation of more comprehensive listening and processing. For example, the waker module may be configured to receive metadata from LPALM, evaluate and compare the metadata to a set of pre-defined triggers, use data collected from additional modules (e.g., visual, motion, etc.) and/or multiple sources (e.g., a combination of user feedback data and large language model (LLM) feedback data, etc.) to determine or calculate confidence or probability value for immediate action or response, and compare the confidence or probability value to a threshold value. The waker module may perform a "shortcut action" in response to determining that the confidence or probability value exceeds the threshold value. On the other hand, the waker module may activate the HPRM in response to determining that the confidence or probability value does not exceed the threshold value.

The HPRM may be a more computationally intensive module that uses more power/energy but provides better performance or more robust speech functionalities (e.g., full speech recognition, complex natural language processing, etc.). The HPRM may be configured to operate in a standby state until it receives an activation signal (e.g., a specific message, a flag, etc.) from the waker module. In response to receiving the activation signal, the HPRM may transition from the standby state to an active state, allocate or prioritize computational and memory resources for its operations, record and analyze in-depth speech data, perform advanced analysis using natural language processing (NLP) algorithms, linguistic cues and/or non-linguistic cues, use the results of the advanced analysis to generate an LLM input query (e.g., a singular input value or string for the LLM component, etc.), and send the LLM input query to the LLM component. In some embodiments, the LPALM, waker module, HPRM and/or other components in the system may receive and use the output from the LLM component to generate a nuanced and holistic output for the user and/or as feedback for refining or fine tuning the operations of the components in the system. In some embodiments, the computing system may update supervisory data and/or adaptively tune the waker module and/or the HPRM based on the output, outcomes, and user feedback (e.g., for future interactions, etc.). The computing system may also monitor battery and resource usage while the HPRM operates in an active state. The computing system may cause the HPRM to reenter the standby state in response to determining that the available resources are below a threshold level.

In some embodiments, the waker module may include, generate, or use multi-source data techniques and/or supervisory data that includes user feedback data and LLM feedback data. Each type of data or feedback data may offer unique, specific, distinct, or different insights. The waker module may merge these datasets into a centralized supervisory dataset and use the centralized supervisory dataset to dynamically and intelligently determine whether to activate the HPRM.

In some embodiments, the waker module may include dynamic decision-making capabilities. For example, the waker module may use the supervisory data to compute a confidence or probability value representing the likelihood that immediate action is desirable, a proposed response is a correct response, and/or an action or response will be acceptable to the user. In some embodiments, the waker module may be configured to perform a "shortcut" action or reaction that circumvents the activation of high-power modules in response to determining that the confidence or probability value exceeds a threshold value. By circumventing the activation of high-power modules, the waker module may improve the performance and power consumption characteristics of the computing system.

In some embodiments, the continuous speech monitoring system may include or use voice recognition for an added layer of specificity. For example, the system may be configured such that the LPALM is only activated for recognized voices, which may enhance system security and/or contextual relevance by eliminating unwarranted activations.

In some embodiments, the waker module may be configured to determine whether to activate the HPRM based on linguistic and/or non-linguistic cues. Examples of linguistic cues that may generated or determined by the system include syntax cues (e.g., arrangement of words and phrases, etc.), semantic cues (e.g., meanings of individual words, phrases, or sentences, etc.), subword cues (e.g., morphemes and other units smaller than words, etc.), context cues (e.g., surrounding words, etc.), and co-occurrence cues (e.g., words that often appear together in a given context, such as "bread and butter", etc.). Examples of non-linguistic cues that may be generated or used by the system include prosody cues (e.g., the rhythm, stress patterns, and intonation of speech, etc.), pitch cues (e.g., variations in the frequency of the voice, etc.), speech rate cues, volume cues (e.g., loudness or softness of the voice, etc.), temporal pattern cues (e.g., pauses or hesitations in speech, etc.), and acoustic feature cues (characteristics that serve as identifiers for different speakers, emotional states, etc.).

In some embodiments, the waker module may be configured to implement a multi-faceted and/or multi-modality solution that activates that LPALM and/or the HPRM based on any combination of information collected on the device, such as audio information, visual information, motion information, etc. By collecting and using information from multiple modules, the waker module may better determine, analyze, or interpret the often complex layers of human interaction and environmental context. This in turn may allow the waker module to make better or more intelligent decisions on whether or when to activate the LPALM and/or the HPRM or perform a shortcut action.

In some embodiments, the HPRM may be configured to use linguistic and non-linguistic cues to generate a singular input sequence for the LLM for a more nuanced and/or holistic output that better matches the user's requests.

In some embodiments, the computing system may be configured to initialize or load the LPALM, HPRM, audio buffer, external memory storage, wake criteria (e.g., phrases, intonations), and privacy settings (e.g., full speech log vs. features). The LPALM may continuously listen for audio, record the detected audio in an audio buffer, analyze incoming audio to identify an enrolled speaker, examine or analyze the audio for context indicators (e.g., tonality, cadence), determine whether context indicators match the wake criteria, send a wake signal to the HPRM (e.g., via the waker module, etc.) in response to determining that the indicators match the wake criteria, transfer audio buffer to external memory when near capacity, apply privacy settings (e.g., extract features, etc.), and/or invoke the PTM in response to determining that the system is connected to a power source. The HPRM may be configured to activate upon receiving the wake signal from the LPALM, access audio buffer to retrieve stored audio leading up to wake signal, perform full speech recognition on retrieved audio to establish context, process context and incoming audio through a NLP engine, and generate a suitable response or action. The HPRM may return to a standby or low-power state and signal the LPALM to resume its operations. The PTM may be configured to review logs stored in external memory, identify points where the LPALM either missed an activation or falsely activated, update wake criteria based on this analysis, use the updated wake criteria and full speech recognition to fine-tune the algorithms or models used by the LPALM, and store the updated algorithms and criteria for future use.

In some embodiments, the computing system may be configured to include a low-power always-on listening mode (corresponding to LPALM), a high-power listening mode (corresponding to HPRM), and machine learning models for both low-power and high-power modes.

In some embodiments, the low-power always-on listening mode may be intelligent in that it wakes up a higher-power AI system (e.g., HPRM, etc.) based on the context of spoken words (plus tonality, cadence, etc.) and not just a key phrase or word. While operating in the low-power always-on listening mode, the computing device may continuously capture and store audio data in an audio buffer, which may be a rolling buffer with a predefined size. Also while in the low-power always-on listening mode, the computing device may analyze the buffered audio data for spoken words, tonality, cadence, etc., use the trained language model to recognize context, tonality, cadence, etc., determine or calculate a confidence score/value based on the model's output, and compare the confidence score/value to a predefined threshold value. In response to determining that the confidence score/value exceeds the predefined threshold value, the computing system may activate the high-power listening mode and provide the last portion of the audio buffer to the high-power mode for instant context-aware assistance.

In some embodiments, the low-power always-on listening mode may include a buffer (i.e., always recording buffer, etc.) and when the high-power listening mode or higher-power AI system is activated, a portion of already spoken words stored in the buffer is provided so that the higher-power mode/system knows the words and context leading up to activation and thus may be activated instantly (instead of asking "how can I help?," etc.).

While operating in the high-power listening mode, the computing device may receive the buffered audio data, perform advanced natural language processing on the received buffer and any additional spoken words, and generate a response or perform an action based on the processed audio data.

In some embodiments, the computing system may be configured to include a periodic training mode (corresponding to the PTM). In some embodiments, the computing system may be configured to enter the periodic training mode in response to determining that the device is connected to a stable power source (e.g., is not operating from the battery, etc.). While operating in the periodic training mode, the computing device may retrieve stored audio data and activation timestamps from the audio buffer, apply the collected audio data to the high-power mode LLM, identify instances in which high-power listening mode activation should have occurred but did not (and/or vice versa, or when it was activated improperly, etc.), label the identified instances and their corresponding timestamps, update the machine learning model for the low-power listening function based on the labels, and replace the current low-power listening model with the newly trained model for improved context-awareness.

The embodiments may provide technical solutions for overcoming various technical challenges faced by existing and conventional AI systems. For example, the embodiments may provide context-sensitive always-on-listening AI capabilities while balancing tradeoffs between the performance and power consumption characteristics of user computing devices. The embodiments may maintain continuous auditory awareness or alertness without consuming an excessive amount of the processing, memory, or battery resources of the computing system. Further, unlike conventional solutions that rely on specific "wake words' to activate the AI system, the embodiments may activate a robust AI system based on a nuanced set of criteria, such as the context of spoken words, tonality and/or cadence of certain phrases or intonations that indicate the user is seeking interaction with the AI system. In addition, some embodiments may include options for storing full speech logs or only specific extracted features based on the user's data privacy settings, and the stored data may be transferred to external memory for future use or analysis when the internal buffer reaches its capacity. When connected to a power source, a HPRM may perform a review of stored speech logs and adapt its activation criteria based on this data (which may allow the system to learn and improve rapidly over time). In addition, the system may perform supervised training and the feedback from the HPRM (which may perform full speech recognition and semantic analysis) may be used to fine-tune the AI models and/or decision-making algorithms of the LPALM.

Various embodiments may be implemented on a number of single-processor and multiprocessor computer systems, including a system-on-chip (SOC) or system in a package (SIP). FIG. 1 illustrates an example computing system or SIP 100 architecture that may be used in mobile computing devices implementing a continuous speech-monitoring AI system in accordance with various embodiments.

With reference to FIG. 1, the illustrated example SIP 100 includes two SOCs 102, 104, a clock 106, a voltage regulator 108, and a wireless transceiver 166. The first and second SOC 102, 104 may communicate via interconnection bus 150. The various processors 110, 112, 114, 116, 118, 121, 122, may be interconnected to each other and to one or more memory elements 120, system components and resources 124, and a thermal management unit 132 via an interconnection bus 126, which may include advanced interconnects such as high-performance networks-on-chip (NOCs). Similarly, the processor 152 may be interconnected to the power management unit 154, the mmWave transceivers 156, memory 158, and various additional processors 160 via the interconnection bus 164. These interconnection buses 126, 150, 164 may include an array of reconfigurable logic gates and/or implement a bus architecture (e.g., Core-Connect, AMBA, etc.). Communications may be provided by advanced interconnects, such as NOCs.

In various embodiments, any or all of the processors 110, 112, 114, 116, 121, 122, in the system may operate as the SoC's main processor, central processing unit (CPU), microprocessor unit (MPU), arithmetic logic unit (ALU), etc. One or more of the coprocessors 118 may operate as the CPU.

In some embodiments, the first SOC 102 may operate as the central processing unit (CPU) of the mobile computing device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SOC 102 may include a digital signal processor (DSP) 110, a modem processor 112, a graphics processor 114, an application processor 116, one or more coprocessors 118 (e.g., vector co-processor, CPUCP, etc.) connected to one or more of the processors, memory 120, deep processing unit (DPU) 121, artificial intelligence processor 122, system components and resources 124, an interconnection bus 126, one or more temperature sensors 130, a thermal management unit 132, and a thermal power envelope (TPE) component 134. The second SOC 104 may include a 5G modem processor 152, a power management unit 154, an interconnection bus 164, a plurality of mmWave transceivers 156, memory 158, and various additional processors 160, such as an applications processor, packet processor, etc.

Each processor 110, 112, 114, 116, 118, 121, 122, 121, 122, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any or all of the processors 110, 112, 114, 116, 118, 121, 122, 121, 122, 152, 160 may be included as part of a processor cluster architecture (e.g., a synchronous processor cluster architecture, an asynchronous or heterogeneous processor cluster architecture, etc.).

Any or all of the processors 110, 112, 114, 116, 118, 121, 122, 121, 122, 152, 160 may operate as the CPU of the mobile computing device. In addition, any or all of the processors 110, 112, 114, 116, 118, 121, 122, 121, 122, 152, 160 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The first and second SOC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, Access ports, timers, and other similar components used to support the processors and software clients running on a computing device. The system components and resources 124 may also include circuitry to interface with peripheral devices, such as cameras, electronic displays, wireless communication devices, external memory chips, etc.

The first and/or second SOCs 102, 104 may further include an input/output module (not illustrated) for communicating with resources external to the SOC, such as a clock 106, a voltage regulator 108, and a wireless transceiver 166 (e.g., cellular wireless transceiver, Bluetooth transceiver, etc.). Resources external to the SOC (e.g., clock 106, voltage regulator 108, wireless transceiver 166) may be shared by two or more of the internal SOC processors/cores.

In addition to the example SIP 100 discussed above, various embodiments may be implemented in a wide variety of computing systems, including a single processor, multiple processors, multicore processors, or any combination thereof.

Figure 2:
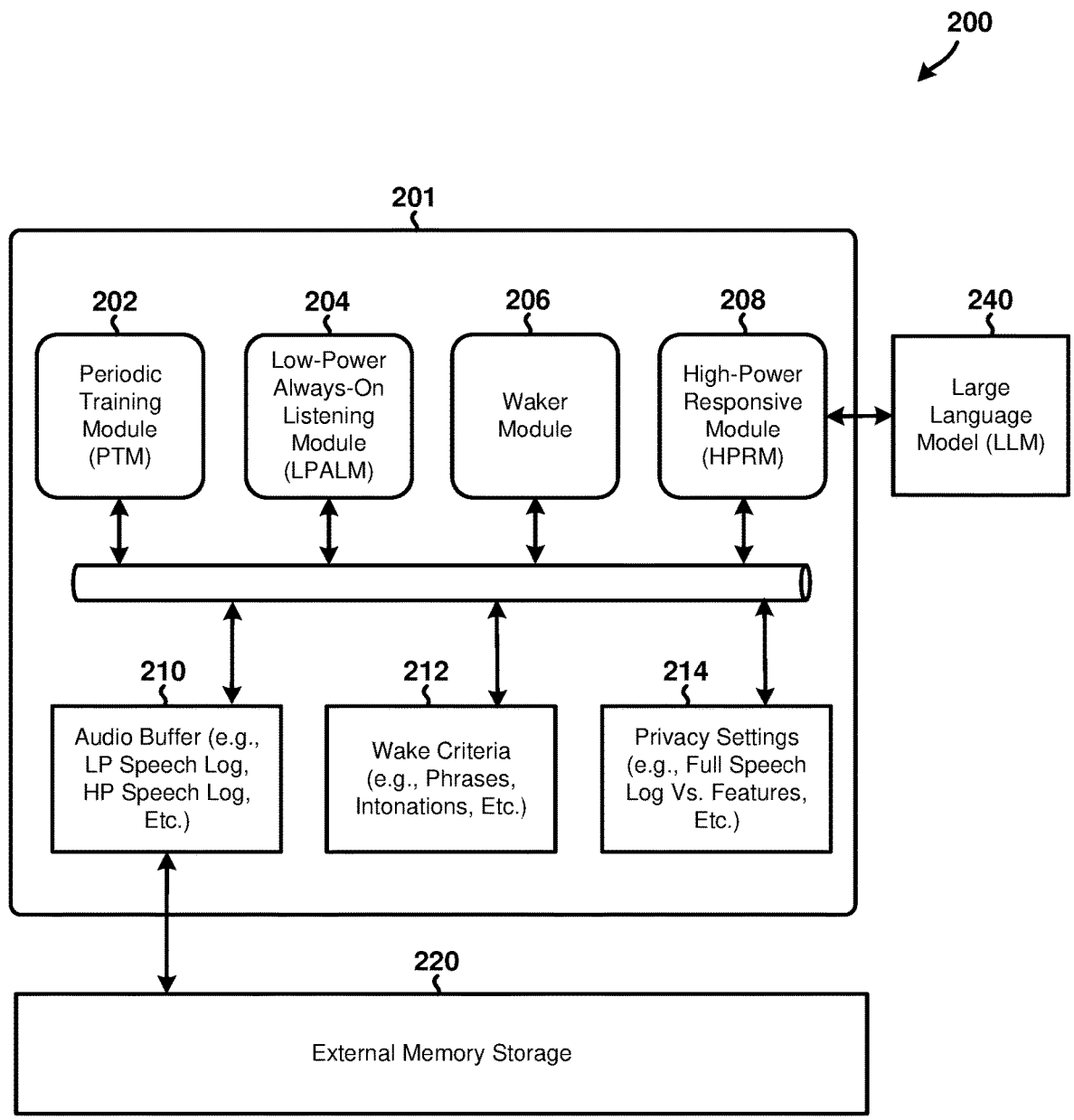
FIG. 2 is a component block diagram illustrating example components and operations in a system configured to implement some embodiments.
Figure 3:
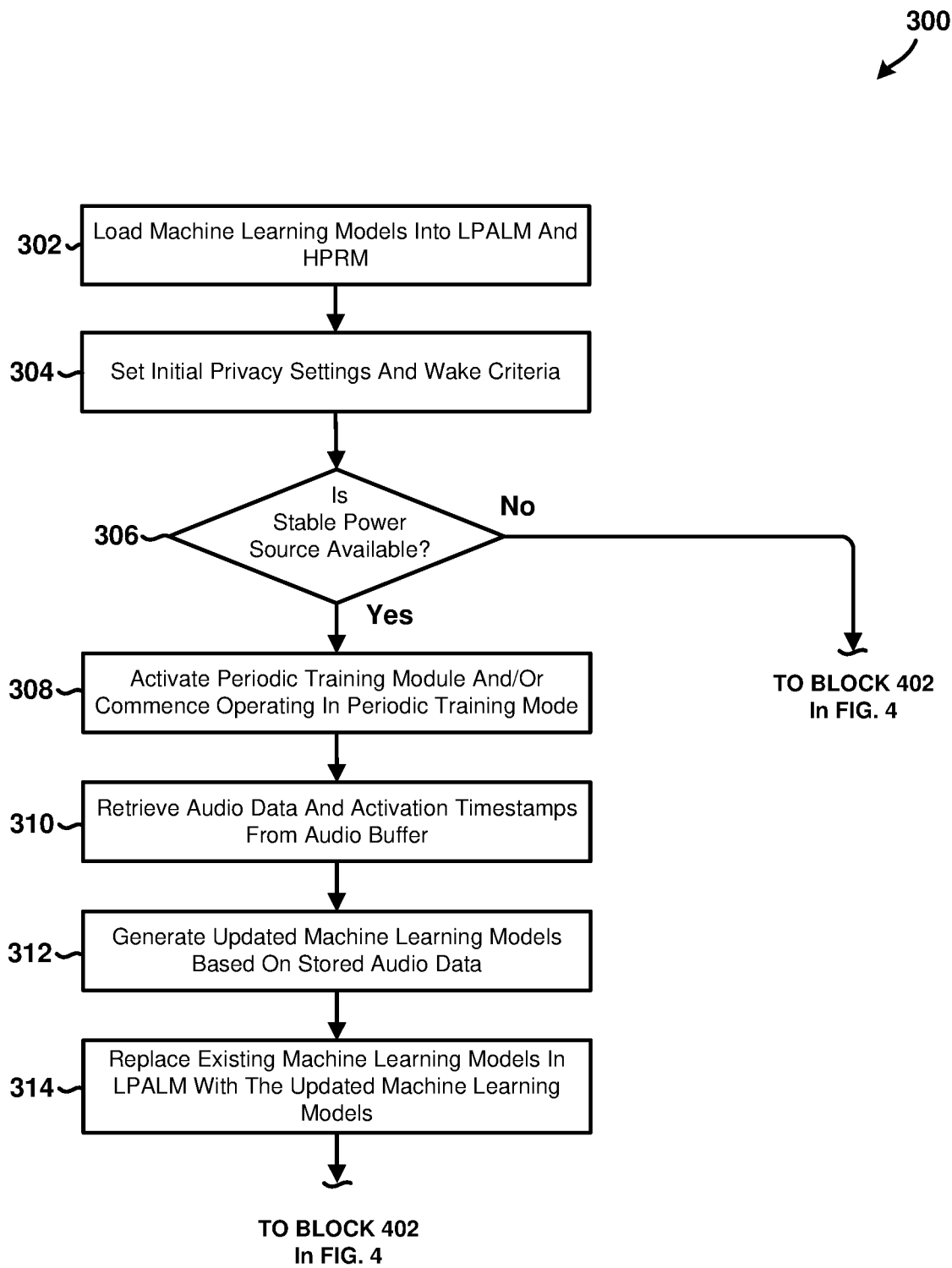
FIGS. 3-6 are process flow diagrams illustrating methods of implementing or operating a continuous speech monitoring artificial intelligence (AI) system that continuously listens to users and analyzes their speech for contextual clues and/or to proactively initiate actions or generate responses in accordance with some embodiments.
Figure 4:
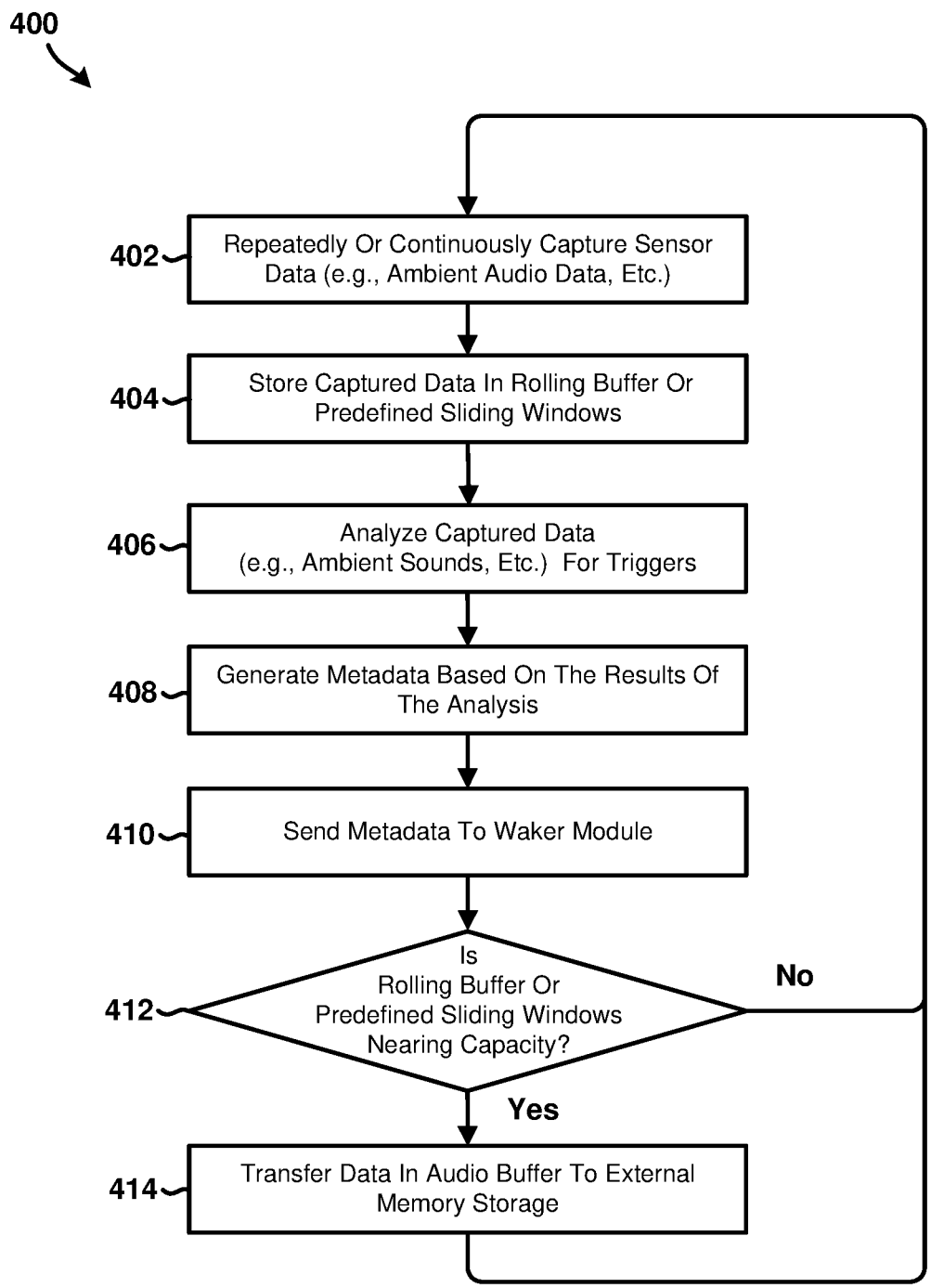
Figure 5:
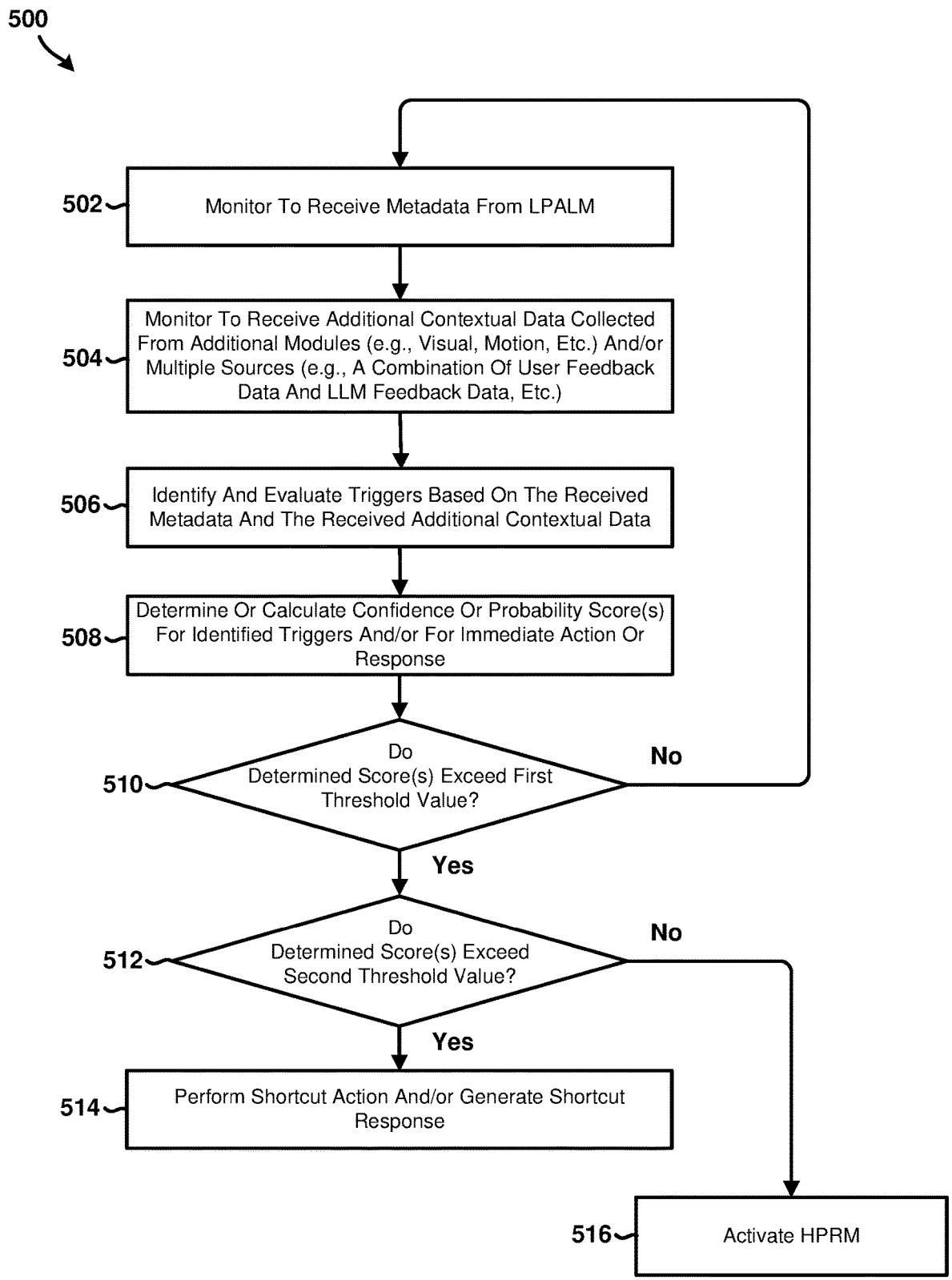
Figure 6:
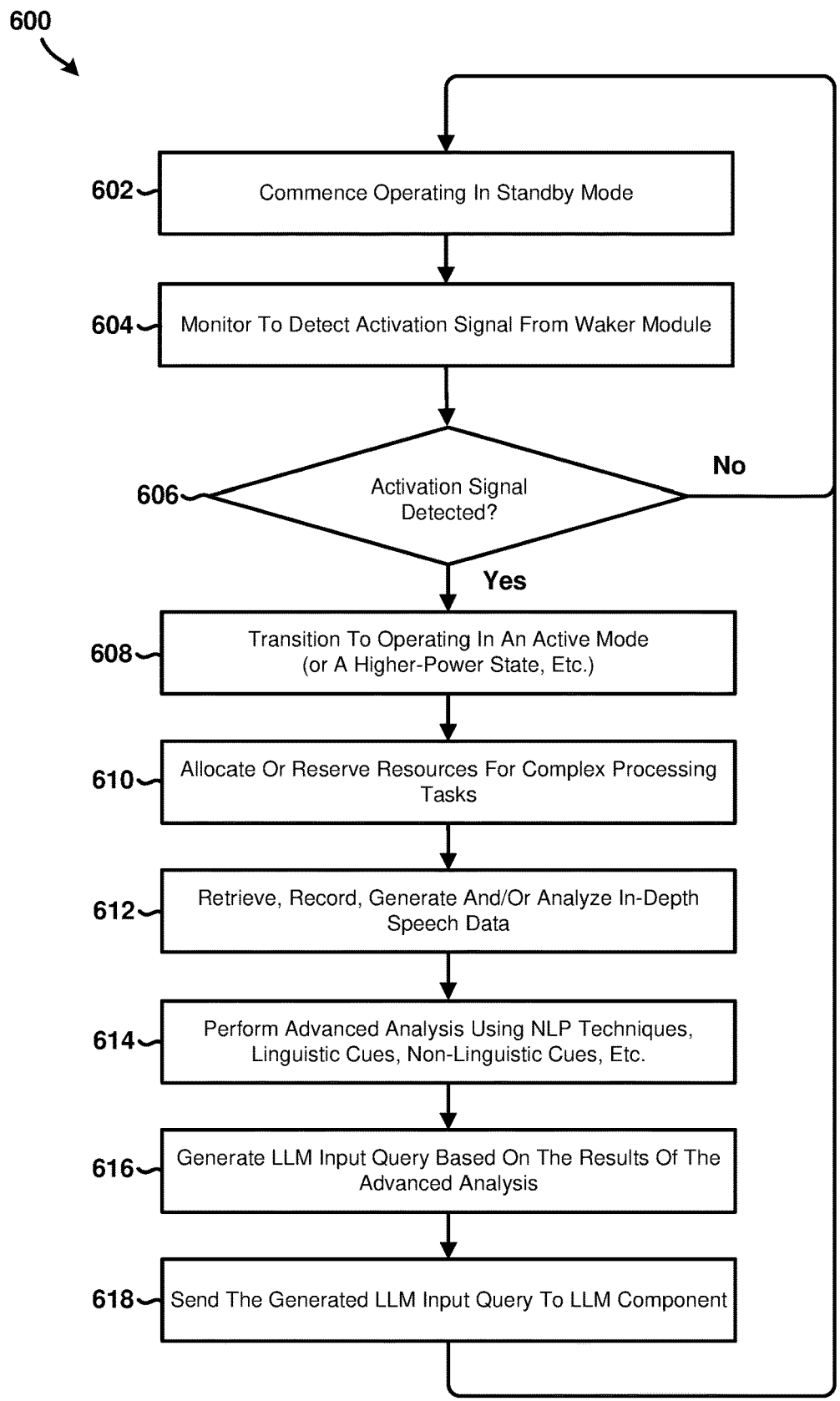

FIG. 2 illustrates example components that could be included in a system configured to implement a continuous speech-monitoring AI system in accordance with the embodiments. With reference to FIGS. 1 and 2, a system 200 (e.g., SIP 100, SOCs 102, 104, etc.) may include a multi-layer continuous speech monitoring sub-system 201 that includes a periodic training module (PTM) 202, a low-power always-on listening module (LPALM) 204, a waker module 206, a high-power responsive module (HPRM) 208, an audio buffer 210, a wake criteria (e.g., phrases, intonations) component 212, and a privacy settings (e.g., full speech log vs. features) component 214. In some embodiments, the system 200 may also include an external memory storage 220 and/or a large language model (LLM) component 240. In some embodiments, the audio buffer may include a low power (LP) speech log and a high power (HP) speech log.

The system 200 may activate the PTM 202 and/or enter a periodic training mode in response to determining that the device is connected to a stable power source (e.g., is not operating from the battery, etc.). In some embodiments, the LPALM 204 may activate or invoke the PTM 202 in response to determining that the system 200 is connected to a power source. The PTM 202 may be configured to receive or retrieve user feedback and LLM feedback, retrieve stored audio data and activation timestamps from the audio buffer 210, apply the collected audio data to the HPRM 208, identify instances in which HPRM activation should have occurred but did not (and/or vice versa, or when it was activated improperly, etc.), label the identified instances and their corresponding timestamps, update the machine learning models for the LPALM 204 based on the labels, and replace the current low-power listening machine learning models with the newly trained models for improved context-awareness.

The LPALM 204 may be configured to maintain a state of continuous auditory awareness or alertness without exerting an undue burden on system resources (e.g., processing, memory, or battery resources). The LPALM 204 may accomplish this by operating predominantly in a low-power state that is geared toward fundamental sensory (e.g., auditory, etc.) operations. These operations may include capturing ambient sounds, analyzing the captured ambient sounds for potential vocal or environmental triggers, and generating metadata based on the analysis results. The LPALM 204 may store the metadata locally or send the metadata to the waker module 206, which may use the metadata in conjunction with other contextual information (e.g., visual and motion data, etc.) to intelligently determine whether to activate the HPRM.

The LPALM 204 may continuously capture audio data, store it in an audio buffer, which may be a rolling buffer of a predefined size or sliding windows. The LPALM 204 may use machine learning models to understand the context, tonality, and cadence of spoken words. The LPALM 204 may determine or calculate a confidence score based on the model's output. The LPALM 204 or the waker module 206 may activate the HPRM 208 in response to determining that the confidence score exceeds a predefined threshold. Activating the HPRM 208 may cause the system 201 to transition into a higher-power operational state that is equipped to provide instant, context-aware assistance. In addition, to further improve performance and resource utilization, the LPALM 204 may transfer its audio buffer 210 to external memory storage 220 when nearing capacity and/or invoke the PTM 202 when a stable power source is detected.

In some embodiments, the LPALM 204 may be configured to provide additional security and contextual relevance and/or to reduce unwarranted system activations by identifying enrolled speakers and storing data or activating the HPRM based on whether the current speaker is an identified enrolled speaker. In some embodiments, the LPALM 204 may integrate with the PTM 202 to improve its machine-learning models. The PTM 202 may be triggered when the device is connected to a stable power source, ensuring that the machine learning models for the LPALM 204 are updated periodically without negatively impacting the device's performance or power consumption characteristics.

The waker module 206 may be configured to act as an intermediary agent that interfaces with the LPALM 204 and HPRM 208. The waker module 206 may evaluate the data and metadata collected by the LPALM 204 to determine whether to invoke the more resource-intensive HPRM 208 for AI or complex auditory processing tasks. In response to receiving metadata from the LPALM 204, the waker module 206 may perform an evaluation or comparison of the metadata against a predefined set of vocal or environmental triggers. As part of these operations, the waker module 206 may also collect, use or incorporate additional data streams, such as visual or motion information. Such a multifaceted approach may improve the capability of the waker module 206 to evaluate the complexity of human communications, human interactions, and environmental context.

In some embodiments, the waker module 206 may be configured to use confidence or probability values calculated based on various metrics to determine its courses of action. These values may be compared against a threshold to determine whether immediate activation of the HPRM 208 or some other action is warranted. The waker module 206 may perform a shortcut action to effectively circumvent the need to activate the HPRM 208 in response to determining that the confidence or probability value surpasses the predetermined threshold.

In some embodiments, the waker module 206 may be configured to use a centralized supervisory dataset to integrate user feedback and LLM feedback and refine its decision-making processes over time. This may also allow for more nuanced activation criteria that include linguistic cues (e.g., syntax, semantics, context, etc.) and non-linguistic cues (e.g., pitch, prosody, acoustic features, etc.). The waker module 206 may be configured to balance tradeoffs between precision and efficiency by intelligently determining whether to activate the LPALM 204 or the HPRM 208 (or perform a shortcut action) based on multi-modal inputs and complex contextual considerations.

The HPRM 208 may be configured to perform more complex processing operations such as NLP and full speech recognition. The HPRM 208 may operate in a standby state and await an activation signal from the waker module 206. In response to receiving the activation signal, the HPRM 208 may transition from the standby state to an active state and allocate computational and memory resources for its tasks. The HPRM 208 may record and analyzes in-depth speech data and use a sophisticated blend of linguistic and non-linguistic cues for analysis. The HPRM 208 may use advanced NLP algorithms to generate a singular input value or string for the LLM 240. The HPRM 208 may further refine the output from the LLM 240 to provide a more detailed and user-centric response to the user. This multi-tiered approach may help ensure that the output presented to the user aligns with the user's needs and the broader context of interaction.

In some embodiments, the HPRM 208 may be configured to monitor its resource usage, determining whether the current resource usage or availability in the computing device has fallen below a specified threshold, and reenter the standby state to conserve power in response to determining that resource usage or availability has fallen below the threshold. In some embodiments, the HPRM 208 may be configured to review the logs and refine its activation criteria when connected to a power source, which may facilitate rapid machine learning and improvement over time.

In some embodiments, the HPRM 208 may be configured to use stored algorithms and criteria to fine-tune the performance of the LPALM 24. For example, the HPRM 108 may review logs to identify instances in which the LPALM 204 or waker module 206 may have missed an activation or falsely activated the HPRM 108 and update the wake criteria 212 accordingly.

FIGS. 3-6 are process flow diagrams illustrating methods 300, 400, 500, 600 implementing or operating a continuous speech monitoring AI system that continuously listens to users and analyzes their speech for contextual clues and/or to proactively initiate actions or generate responses in accordance with some embodiments. With reference to FIGS. 1-6, the methods 300, 400, 500, and/or 600 may be performed in a computing device by processing system encompassing one or more processors (e.g., 110, 112, 114, 116, 118, 121, 122, 121, 122, 152, 160, etc.), components or subsystems discussed in this application. Means for performing the functions of the operations in the methods 300, 400, 500, and/or 600 may include a processing system including one or more of processors 110, 112, 114, 116, 118, 121, 122, 121, 122, 152, 160, and other components described herein. Further, one or more processors of a processing system may be configured with software or firmware to perform some or all of the operations of the methods 300, 400, 500, and/or 600. In order to encompass the alternative configurations enabled in various embodiments, the hardware implementing any or all of the methods 300, 400, 500, and/or 600 is referred to herein as a "processing system."

With reference to FIGS. 1-6, in block 302, the processing system may load machine learning models into the LPALM and the HPRM to facilitate continuous speech analysis and responsive actions. Loading the machine learning models into the LPALM may allow the LPALM to perform foundational speech recognition tasks with reduced or minimal energy consumption. Loading the machine learning models into the HPRM may allow the HPRM to perform more complex operations resource-intensive actions when activated. Examples of machine learning models that could be loaded into LPALM are decision trees or lightweight neural networks designed to recognize words or phrases with high efficiency. The HPRM may be configured with more complex models, such as Long Short-Term Memory (LSTM) networks or Transformer models, that are better suited for understanding context, detecting emotions in the user's speech, etc. These models contribute to the implementation or operation of a continuous speech monitoring system by providing the requisite capabilities for real-time analysis of audio inputs. The LPALM may use its machine learning models to screen audio data with reduced or minimal energy consumption, passing on relevant data to the HPRM, which may use its more sophisticated models to make better or more nuanced interpretations or decisions. In some embodiments, this hierarchical processing arrangement may allow the system to make context-aware decisions and more efficiently perform tasks such as identifying user needs, suggesting actions, or initiating workflows based on the analyzed speech.

In block 304, the processing system may set initial privacy settings and wake criteria. The processing system may use initial privacy settings to determine how to manage the captured audio data and/or may allow the multi-layer continuous speech monitoring system to balance user data privacy and the use of personal or private data to carry out its functionalities. For example, the system may default to storing only specific extracted features rather than full speech logs, thereby reducing the volume of personal data that is stored and processed. These settings may be particularly beneficial in systems in which privacy concerns are heightened. Setting the wake criteria (e.g., specific phrases, tonal qualities, cadences, etc.) may allow the system to better guide the LPALM, reduce false positives, and better determine the relevant information that triggers the HPRM for further analysis and action. The wake criteria may be nuanced and include contextual cues that offer an advancement over traditional systems that typically rely on specific "wake words." For example, the enhanced wake criterion may allow the system to remain contextually aware while using fewer computational and energy resources.

In some embodiments, PTM and/or the HPRM may fine-tune the privacy settings and wake criteria over time. For example, the HPRM may analyze logs to determine occasions in which the LPALM may have failed to activate or activated erroneously and modify the wake criteria accordingly to enhance system performance. These adjustments may allow for a more dynamic and context-aware system and ameliorate some limitations of conventional solutions and systems, such as rigidity in activation cues or heavy computational loads that could have a negative or user-perceivable impact on device performance or user privacy.

In determination block 306, the processing system may determine whether there is a stable power source available. The processing system may use any of a variety of known techniques to determine the availability of a stable power source. Hardware-based sensors and software algorithms often work in tandem to detect the current power state of the device. For example, electrical voltage levels and current flow may be monitored to assess whether the device is connected to an electrical outlet as opposed to relying on battery power. The system may also use application programming interface (API) calls to the operating system to query the power status, which may return information on whether the device is running on AC power, and if so, whether the connection is stable.

In response to determining that there is a stable power source available (i.e., determination block 306="Yes"), the processing system may activate the Periodic Training Module (PTM) and/or commence operating in a periodic training mode in block 308. As discussed above, the PTM may be configured to perform a variety of resource-intensive tasks, such as processing stored audio data and activation timestamps, updating machine learning models, receiving or retrieving feedback, apply collected audio data to the HPRM, etc. These operations may demand a higher level of power and performing such tasks while operating solely on battery power may quickly deplete the device's battery life. As such, the system may be configured to trigger the PTM only when the device is connected to a stable power source. This allows the system to perform processor-intensive or power-intensive operations without causing an undue drain on the device's resources.

In block 310, the processing system may retrieve audio data and activation timestamps from audio buffer. The audio buffer may be a temporary storage in which incoming audio data and its corresponding activation timestamps, which are important for both real-time and post-event analytics, are stored for a specified period or until processed. Further, the processing system may engage in periodic training activities. During these training cycles, the processing system may use audio data and activation timestamps from the audio buffer to refine machine learning models. The timestamps may serve as a chronological guide to align the audio data with specific events, thereby providing a contextual basis for analyzing the performance of the models. In addition, by examining the retrieved audio data and timestamps, the processing system may better determine whether the LPALM or HPRM failed to activate when it should have and/or activated when it should not have. The processing system may use such observations for the re-labeling process during training to further enhance the models' performance in context recognition and responsiveness. Further, in real-time operations, the audio data and activation timestamps may be required for immediate processing operations. For example, upon receipt of a wake signal, the HPRM may access the audio buffer to fetch the audio leading up to the activation event. This data may be important for performing in-depth speech recognition tasks and generating appropriate responses or actions.

In block 312, the processing system may generate updated machine learning models based on stored audio data. For example, the processing system may retrieve and evaluate the audio data and associated activation timestamps stored in the audio buffer to identify specific instances in which the system either failed to activate when it should have or activated when it should not have, label the identified instances and their corresponding timestamps, generate a training dataset, and use the labeled dataset to adjust or train the existing machine learning models. In some embodiments, the training operations may include using gradient descent, backpropagation, or other optimization techniques to minimize a loss function, quantifying the difference between the model's predictions and actual outcomes, guiding the model toward improved performance, using feature extraction methods to generate relevant features that contribute to the learning process, which may include applying Fourier transforms or Mel Frequency Cepstrum Coefficients (MFCCs) to the audio data. Identifying MVCCs is a method of feature extraction for speech and audio analysis, particularly for use in AI systems. MFCCs are a compact representation of audio spectrum.

In block 314, the processing system may replace existing machine learning models in LPALM with the updated machine learning models. That is, after the training operations are complete, the processing system may replace the existing machine learning models with the newly trained and/or updated machine learning models. These new machine learning models may offer better context-awareness and responsiveness based on the recent data. By continually updating its machine learning models, the system may better adapt to changing conditions and nuances in user interactions.

After replacing existing machine learning models with the updated machine learning models in block 314 or in response to determining that there is no stable power source available (i.e., determination block 306="No"), the processing system may commence performing the operations of method 400.

In block 402, the processing system may repeatedly or continuously capture sensor data (e.g., ambient audio data, etc.). This continual capturing of data may allow the system to maintain an updated context of its surroundings and/or may facilitate prompt responses to relevant stimuli.

In block 404, the processing system may store captured data in an audio buffer, which in some embodiments may be a rolling buffer or a buffer memory with predefined sliding windows. A rolling buffer (or circular buffer) is a data structure used for storing information so that when the buffer reaches its capacity limit, the newest data overwrites the oldest data. The audio buffer may operate on a "first-in, first-out" (FIFO) principle in which the oldest data is removed to make room for new data when the buffer is full. This is often utilized in scenarios where a continuous stream of data is being received but only the most recent data is of interest. Similarly, a predefined sliding window may be a fixed-size segment of data that moves over a larger data set in a predefined manner. Unlike a rolling buffer, the data in a sliding window is typically not overwritten. Rather, the "window" through which the data set is viewed slides along the data set. This is commonly used in analyses where the relationship between consecutive or near-consecutive data points needs to be considered for a specific period. Once the window reaches its capacity, it slides forward to analyze the next segment, which may have some overlap with the previous segment. While storing the captured data in the audio buffer (e.g., a rolling buffer or with predefined sliding windows) the system may add a temporal dimension to the data, such as time stamps. The system may analyze not just individual data points but also patterns or sequences that may unfold over a period of time.

In block 406, the processing system may analyze captured data (e.g., ambient sounds, etc.) for triggers. For example, the processing system may analyze the data stored in the audio buffer for spoken words, tonality, cadence, etc., use the trained language model to recognize context, tonality, cadence, etc. to identify specific triggers, which could be particular sounds, sequences of sounds, or other relevant sensory patterns. The system may use such analysis to determine whether and how to perform further actions, such as activating or waking up a high-power module.

In block 408, the processing system may generate metadata based on the results of the analysis. The generated metadata may summarize key characteristics of the captured data. In some embodiments, the metadata may include tags, scores, or other descriptors that simplify the content and make it easier to process quickly.

In block 410, the processing system may send metadata to waker module. As discussed in detail further below with reference to FIG. 5, the waker module may use the metadata to determine whether the conditions for waking a higher-power processing module have been met.

In determination block 412, the processing system may determine whether the audio buffer (e.g., rolling buffer or predefined sliding window buffer) is nearing its storage capacity. That is, the processing system may check to determine whether the audio buffer data storage is nearing its capacity limit.

In response to determining that the audio buffer is nearing capacity (i.e., determination block 412="Yes"), the processing system may transfer data in audio buffer to external memory storage in block 414. This may help ensure that the real-time data capturing may continue without interruption, while the stored data remains available for future analysis or training.

In block 502, the processing system may monitor to receive metadata from LPALM. The metadata may include analyses of sensor data, such as ambient audio data, that have been previously captured and evaluated by the LPALM.

In block 504, the processing system may monitor to receive additional contextual data collected from additional modules (e.g., visual, motion, etc.) and/or multiple sources (e.g., a combination of user feedback data and LLM feedback data, etc.).

In block 506, the processing system may identify and evaluate triggers based on the received metadata and the received additional contextual data. A trigger may be a word, phrase, or other indicators that prompt the system to take specific actions.

In block 508, the processing system may determine or calculate confidence or probability score(s) for identified triggers and/or for immediate action or response. The scores may use a numerical value to characterize or represent the likelihood that the identified trigger is a legitimate prompt for action.

In determination block 510, the processing system may determine whether the determined score(s) exceed a first threshold value. In response to determining that the determined score(s) do not exceed the first threshold value (i.e., determination block 510="No"), the processing system may continue to monitor to receive metadata from the LPALM in block 502.

In response to determining that the determined score(s) exceed the first threshold value (i.e., determination block 510="Yes"), the processing system may determine whether the determined score(s) exceed a second threshold value in determination block 512.

In response to determining that the determined score(s) exceed the second threshold value (i.e., determination block 512="Yes"), the processing system may perform a shortcut action and/or generate a shortcut response in block 514.

In response to determining that the determined score(s) do not exceed the second threshold value (i.e., determination block 512="No"), the processing system may activate the HPRM in block 516.

In block 602, the processing system may commence operating in standby mode. The standby mode may be intermediate state that keeps the system alert to specific triggers without fully engaging its resource-intensive modules. In this mode, the system may limit its activities to essential tasks, such as monitoring for activation signals or specific conditions requiring it to transition into a more active state. Operating in standby mode may be particularly beneficial for mobile devices or other battery-operated systems for which battery life is important. In addition, operating in standby mode may reduce the risk of unnecessary activations and data processing. This may be particularly relevant for systems that aim to balance robust performance with the constraints of limited computational resources.

In block 604, the processing system may monitor to detect an activation signal from waker module. The processing system may monitor for an activation signal from the waker module as part of its function to facilitate a transition from a low-resource-consuming state to a more active and resource-intensive state. The waker module may perform the initial assessments of sensor data, such as audio or visual cues, to determine whether a condition has been met that warrants the attention of more computationally expensive modules in the system. By concentrating on detecting specific triggers or conditions, the waker module may serve to operate as an initial filter that reduces the computational burden on the system as a whole. As such, by monitoring for an activation signal in block 604, the system may remain responsive to user input or environmental changes without consuming excessive computational resources.

In determination block 606, the processing system may determine whether an activation signal was received. In response to determining that an activation signal was not received (i.e., determination block 606="No"), the processing system may continue operating in standby mode and monitor to detect an activation signal from waker module in block 602 and 604. In response to determining that an activation signal was received (i.e., determination block 606="Yes"), the processing system may transition to operating in an active mode (or a higher-power state, etc.) in block 608. That is, when an activation signal is detected, the processing system may shift from its standby or low-power state into a more active state, allocating more resources for complex tasks such as natural language processing or full speech recognition. This may allow the system to provide more advanced functionalities only when they are likely to be needed, thereby improving the performance, functionality, and efficiency of the system.

In block 610, the processing system may allocate or reserve resources for complex processing tasks. By dedicating resources only when they are likely to be used for complex tasks, the system may conserve energy and extend the battery life of the device. This is particularly relevant for applications in which the system spends a considerable amount of time in low-power or standby states, awaiting activation. These operations also help ensure that the system has adequate computational power and memory to successfully execute complex and/or resource-intensive tasks, such as those involved in natural language processing or high-definition image recognition.

In block 612, the processing system may retrieve, record, generate and/or analyze in-depth speech data. The in-depth speech data may include robust contextual information that may be used by the processing system to understand the user's intent or emotion. For example, nuances such as tone, speed, or even background noise may provide valuable insights into the context within which a user command is given, which may in turn facilitate generating more accurate and/or more context-aware responses. In addition, a detailed analysis of speech data may contribute to developing more sophisticated NLP algorithms. Over time, the system may refine its understanding of spoken language, idiomatic phrases, regional accents, or even individual user speech patterns, thereby improving its ability to interact in a more natural and intuitive manner.

In addition, recording and storing speech data may be beneficial for retrospective analysis, particularly for training. For example, if there are instances where the system misinterprets a command or fails to act, the processing system may analyze the stored data to understand what went wrong and how the algorithms could be refined. As a further example, the in-depth speech data may be used to train machine learning models to adapt to new patterns or forms of speech, allowing the system to maintain a degree of flexibility. The in-depth speech data may also provide auxiliary benefits, such as supporting multi-modal interaction (e.g., combining speech with visual cues) or enabling more advanced features like voice biometrics for enhanced security.

In block 614, the processing system may perform advanced analysis using NLP techniques, linguistic cues, non-linguistic cues, etc. By using advanced NLP techniques and various cues, the processing system may better understand and respond to user commands in a nuanced and contextually rich manner to enhance its operational efficiency and the quality of user interactions. As part of the operations in block 614, the processing system may analyze linguistic cues such as syntax, semantics, subword elements, context, and co-occurrence. The processing system may also analyze non-linguistic cues such as prosody, pitch, volume, speech rate, temporal patterns, and acoustic features. In some embodiments, the processing system may also analyze output from the LLM generated by other components along with outcomes and user feedback for adaptative tuning or refinements of future interactions.

In block 616, the processing system may generate an LLM input query based on the results of the advanced analysis. For example, the processing system may use the advanced analysis results to generate a singular input value or string that is input to the LLM component as a condensed yet comprehensive representation of the user's intent, context, and emotional state.

In block 618, the processing system may send the generated LLM Input query to LLM component. The generated LLM Input query may be condensed representation that is sent to a LLM component. Providing the LLM with a well-crafted input query may allow the LLM component to generate more accurate and context-aware responses.

Figure 7:
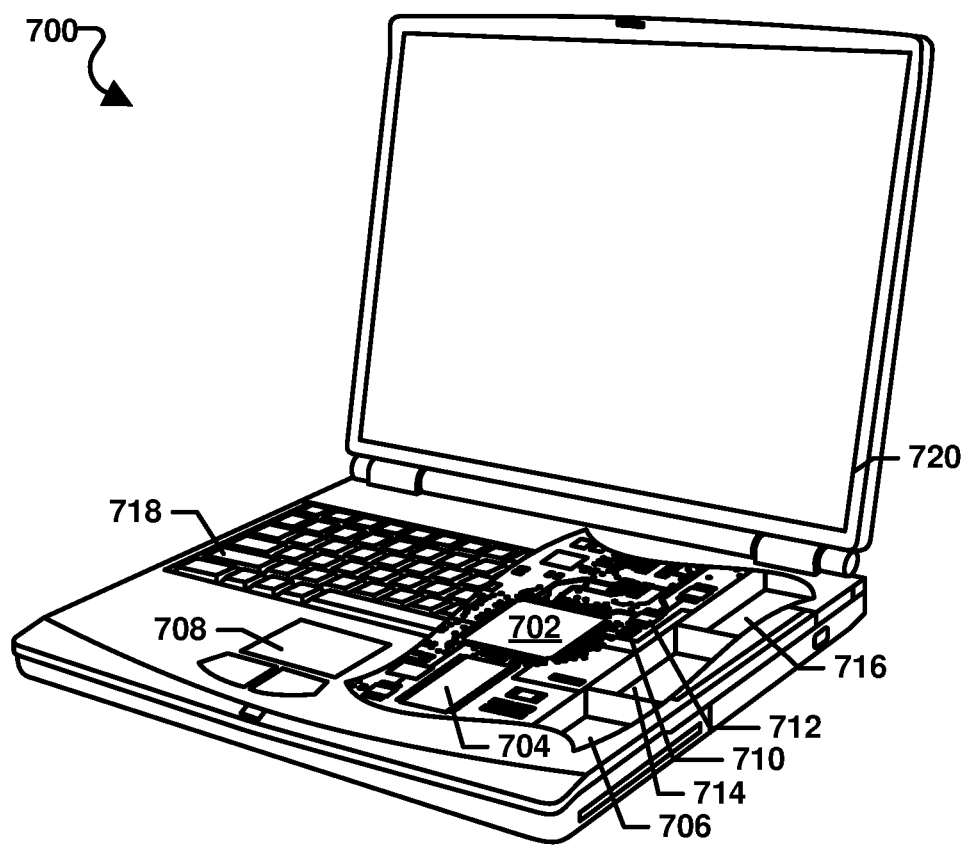
FIG. 7 is a component block diagram illustrating an example computing device in the form of a laptop that is suitable for implementing some embodiments.

Various embodiments (including, but not limited to, embodiments described above with reference to FIGS. 1-6) may be implemented in a wide variety of wireless devices and computing systems including a laptop computer 700, an example of which is illustrated in FIG. 7. With reference to FIGS. 1-7, a laptop computer may include a processor 702 coupled to volatile memory 704 and a large capacity non-volatile memory, such as a disk drive 706 of Flash memory. The laptop computer 700 may include a touchpad touch surface 708 that serves as the computer's pointing device, and thus may receive drag, scroll, and flick gestures. Additionally, the laptop computer 700 may have one or more antenna 710 for sending and receiving electromagnetic radiation that may be connected to a wireless data link and/or cellular telephone transceiver 712 coupled to the processor 702. The computer 700 may also include a BT transceiver 714, a compact disc (CD) drive 716, a keyboard 718, and a display 720 all coupled to the processor 702. Other configurations of the computing device may include a computer mouse or trackball coupled to the processor (e.g., via a Universal Serial Bus (USB) input) as are well known, which may also be used in conjunction with various embodiments.

Figure 8:
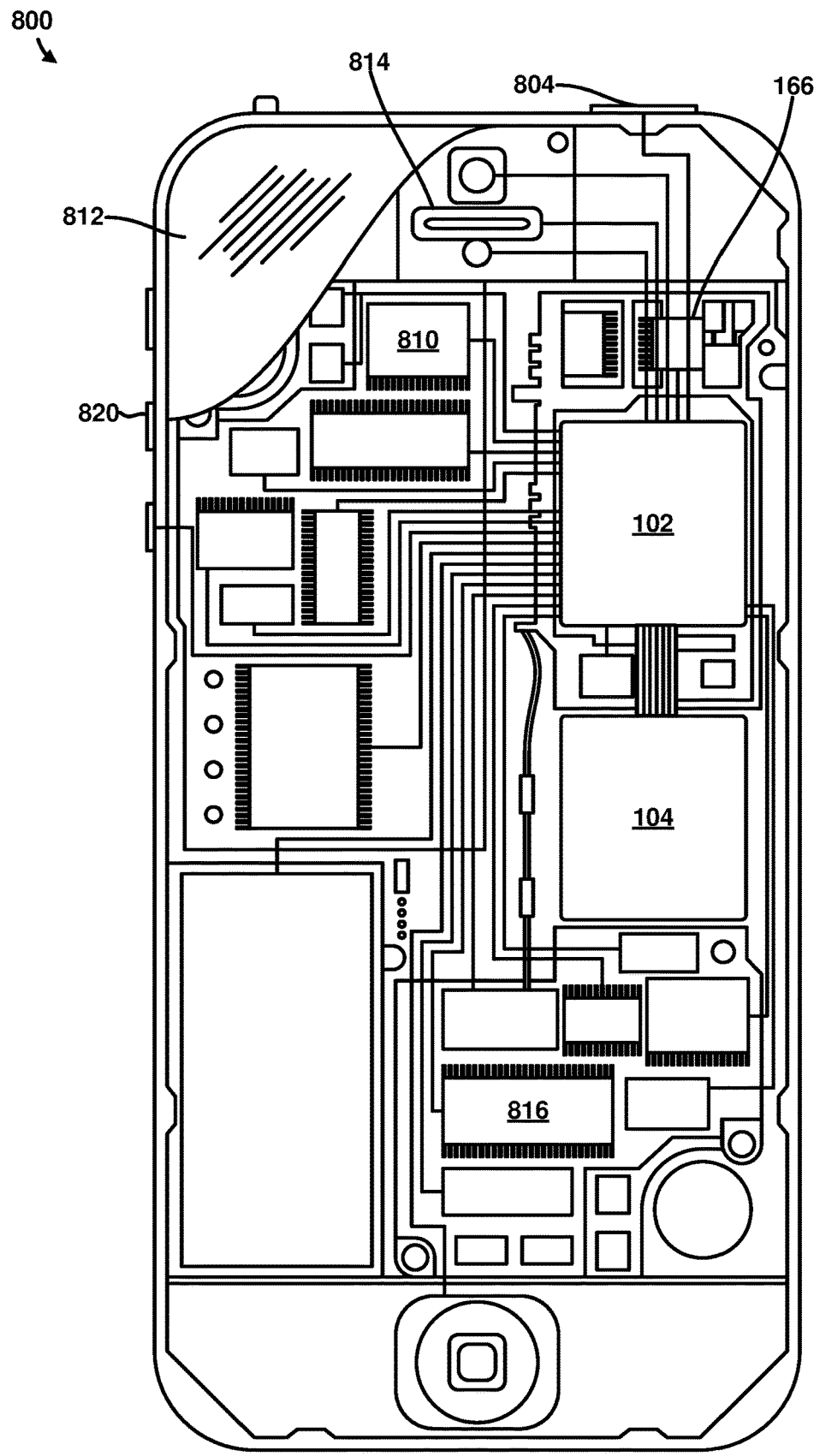
FIG. 8 is a component block diagram illustrating an example wireless communication device suitable for use with various embodiments.

FIG. 8 is a component block diagram of a computing device 800 suitable for use with various embodiments. With reference to FIGS. 1-8, various embodiments may be implemented on a variety of computing devices 800, an example of which is illustrated in FIG. 8 in the form of a smartphone. The computing device 800 may include a first SOC 102 coupled to a second SOC 104. The first and second SoCs 102, 104 may be coupled to internal memory 816, a display 812, and to a speaker 814. The first and second SOCs 102, 104 may also be coupled to at least one subscriber identity module (SIM) 840 and/or a SIM interface that may store information supporting a first 5GNR subscription and a second 5GNR subscription, which support service on a 5G non-standalone (NSA) network.

The computing device 800 may include an antenna 804 for sending and receiving electromagnetic radiation that may be connected to a wireless transceiver 166 coupled to one or more processors in the first and/or second SOCs 102, 104. The computing device 800 may also include menu selection buttons or rocker switches 820 for receiving user inputs.

The computing device 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second circuitries 102, 104, wireless transceiver 166 and CODEC 810 may include a digital signal processor (DSP) circuit (not shown separately).

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of continuously monitoring speech for preemptive or context-aware answers to user queries, including collecting, in a low-power always-on listening mode operating on a processing system in a computing device, ambient audio data and storing the collected ambient audio data and activation timestamps in an audio buffer as buffered audio data, determining a confidence score based on a result of analyzing the buffered audio data for linguistic cues or non-linguistic cues, and activating a high-power listening mode and providing a last portion of the audio buffer to the high-power mode for instant context-aware assistance in response to determining that the confidence score exceeds a threshold value.

Example 2: The method of example 1, in which determining the confidence score based on a result of analyzing the buffered audio data for linguistic cues or non-linguistic cues includes determining the confidence score based on a result of analyzing the buffered audio data for linguistic cues that include syntax cues, semantic cues, subword cues, context cues, and co-occurrence cues.

Example 3: The method of either of the examples 1 or 2, in which determining the confidence score based on a result of analyzing the buffered audio data for linguistic cues or non-linguistic cues includes determining the confidence score based on a result of analyzing the buffered audio data for non-linguistic cues that include prosody cues, pitch cues, speech rate cues, volume cues, temporal pattern cues, and acoustic feature cues.

Example 4: The method of any of the examples 1-3, further including using a trained language model to identify linguistic cues or non-linguistic cues.

Example 5: The method of any of the examples 1-4, further including transitioning to a periodic training mode in response to determining that the computing device is connected to a stable power source.

Example 6: The method of any of the examples 1-5, further including retrieving the buffered audio data and activation timestamps from the audio buffer, using a result of applying the retrieved audio data to a large language model (LLM) to identify instances in which activation high-power listening mode should have occurred but did not, labeling the identified instances and their corresponding timestamps, generating updated machine learning models for the low-power always-on listening mode based on the labels, and replacing a current machine learning model of the low-power listening mode with the generated updated machine learning models.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a vehicle's advanced driver assistance system (ADAS), system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
    a processing system configured to:
        collect, in a low-power always-on listening mode, ambient audio data and storing the collected ambient audio data and activation timestamps in an audio buffer as buffered audio data;
        determine a confidence score based on a result of analyzing the buffered audio data for linguistic cues or non-linguistic cues; and
        activate a high-power listening mode and providing a last portion of the audio buffer to the high-power mode for instant context-aware assistance in response to determining that the confidence score exceeds a threshold value;
        wherein the linguistic cues comprise one or more of syntax cues, semantic cues, subword cues, context cues, and co-occurrence cues; and
        wherein the non-linguistic cues comprise one or more of prosody cues, pitch cues, speech rate cues, volume cues, temporal pattern cues, and acoustic feature cues;
        wherein the processing system is further configured to:
        retrieve the buffered audio data and activation timestamps from the audio buffer;
        use a result of applying the retrieved audio data to a large language model (LLM) to identify instances in which activation high-power listening mode should have occurred but did not;
        label the identified instances and their corresponding timestamps;
        generate updated machine learning models for the low-power always-on listening mode based on the labels; and
        replace a current machine learning model of the low-power listening mode with the generated updated machine learning models.

2. The computing device of claim 1, wherein the processing system is further configured to use a trained language model to identify linguistic cues or non-linguistic cues.

3. The computing device of claim 1, wherein the processing system is further configured to transition to a periodic training mode in response to determining that the computing device is connected to a stable power source.

4. A method of continuously monitoring speech for preemptive or context-aware answers to user queries, comprising:
    collecting, in a low-power always-on listening mode operating on a processing system in a computing device, ambient audio data and storing the collected ambient audio data and activation timestamps in an audio buffer as buffered audio data;
    determining a confidence score based on a result of analyzing the buffered audio data for linguistic cues or non-linguistic cues;
    activating a high-power listening mode and providing a last portion of the audio buffer to the high-power mode for instant context-aware assistance in response to determining that the confidence score exceeds a threshold value;
    retrieving the buffered audio data and activation timestamps from the audio buffer;
    using a result of applying the retrieved audio data to a large language model (LLM) to identify instances in which activation high-power listening mode should have occurred but did not;
    labeling the identified instances and their corresponding timestamps;
    generating updated machine learning models for the low-power always-on listening mode based on the labels; and
    replacing a current machine learning model of the low-power listening mode with the generated updated machine learning models;
    wherein the linguistic cues comprise one or more of syntax cues, semantic cues, subword cues, context cues, and co-occurrence cues; and
    wherein the non-linguistic cues comprise one or more of prosody cues, pitch cues, speech rate cues, volume cues, temporal pattern cues, and acoustic feature cues.

5. The method of claim 4, further comprising using a trained language model to identify linguistic cues or non-linguistic cues.

6. The method of claim 4, further comprising transitioning to a periodic training mode in response to determining that the computing device is connected to a stable power source.

7. A non-transitory computer readable storage medium having stored thereon processor-executable software instructions configured to cause a processing system in a computing device to perform operations for continuously monitoring speech for preemptive or context-aware answers to user queries, the operations comprising:
    collecting, in a low-power always-on listening mode operating, ambient audio data and storing the collected ambient audio data and activation timestamps in an audio buffer as buffered audio data;

determining a confidence score based on a result of analyzing the buffered audio data for linguistic cues or non-linguistic cues;

activating a high-power listening mode and providing a last portion of the audio buffer to the high-power mode for instant context-aware assistance in response to determining that the confidence score exceeds a threshold value;

retrieving the buffered audio data and activation timestamps from the audio buffer;

using a result of applying the retrieved audio data to a large language model (LLM) to identify instances in which activation high-power listening mode should have occurred but did not;

labeling the identified instances and their corresponding timestamps;

generating updated machine learning models for the low-power always-on listening mode based on the labels; and replacing a current machine learning model of the low-power listening mode with the generated updated machine learning models;

wherein the linguistic cues comprise one or more of syntax cues, semantic cues, subword cues, context cues, and co-occurrence cues; and wherein the non-linguistic cues comprise one or more of prosody cues, pitch cues, speech rate cues, volume cues, temporal pattern cues, and acoustic feature cues.

8. The non-transitory computer readable storage medium of claim 7, wherein the stored processor-executable software instructions are configured to cause a processor to perform operations further comprising using a trained language model to identify linguistic cues or non-linguistic cues.

9. The non-transitory computer readable storage medium of claim 7, wherein the stored processor-executable software instructions are configured to cause a processor to perform operations further comprising transitioning to a periodic training mode in response to determining that the computing device is connected to a stable power source.

10. A computing device, comprising:

means for collecting, in a low-power always-on listening mode, ambient audio data and storing the collected ambient audio data and activation timestamps in an audio buffer as buffered audio data;

means for determining a confidence score based on a result of analyzing the buffered audio data for linguistic cues or non-linguistic cues;

means for activating a high-power listening mode and providing a last portion of the audio buffer to the high-power mode for instant context-aware assistance in response to determining that the confidence score exceeds a threshold value;

means for retrieving the buffered audio data and activation timestamps from the audio buffer;

means for using a result of applying the retrieved audio data to a large language model (LLM) to identify instances in which activation high-power listening mode should have occurred but did not;

means for labeling the identified instances and their corresponding timestamps;

means for generating updated machine learning models for the low-power always-on listening mode based on the labels; and means for replacing a current machine learning model of the low-power listening mode with the generated updated machine learning models;

wherein the linguistic cues comprise one or more of syntax cues, semantic cues, subword cues, context cues, and co-occurrence cues; and wherein the non-linguistic cues comprise one or more of prosody cues, pitch cues, speech rate cues, volume cues, temporal pattern cues, and acoustic feature cues.

11. The computing device of claim 10, further comprising means for using a trained language model to identify linguistic cues or non-linguistic cues.

12. The computing device of claim 10, further comprising means for transitioning to a periodic training mode in response to determining that the computing device is connected to a stable power source.

* * * * *